(12) United States Patent
Kurihara (10) Patent No.: US 7,095,990 B2
(45) Date of Patent: Aug. 22, 2006

(54) DELAY PROFILE MAKING METHOD AND DELAY PROFILE MAKING APPARATUS

(75) Inventor: Naoyuki Kurihara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 468 days.

(21) Appl. No.: 10/620,353

(22) Filed: Jul. 17, 2003

(65) Prior Publication Data

US 2004/0028008 A1    Feb. 12, 2004

(30) Foreign Application Priority Data

Aug. 6, 2002    (JP)    ............................. 2002-229016

(51) Int. Cl.
*H04B 7/08*    (2006.01)
*H04B 1/06*    (2006.01)
*H04B 15/00*    (2006.01)

(52) U.S. Cl. ................... 455/130; 455/140; 455/242.1; 455/506; 375/150

(58) Field of Classification Search ................ 455/65, 455/133, 140, 276.1, 303, 306, 185.1, 242.1, 455/242.2, 243.1, 504–506, 412.1, 514; 375/148, 375/343, 150; 370/342
See application file for complete search history.

(56) References Cited

U.S. PATENT DOCUMENTS

| | | | |
|---|---|---|---|
| 5,982,763 A | | 11/1999 | Sato |
| 6,282,234 B1 * | | 8/2001 | Kameno et al. ............. 375/148 |
| 6,356,542 B1 * | | 3/2002 | Hayata ........................ 370/342 |
| 6,490,316 B1 | | 12/2002 | Motegi et al. |
| 6,516,020 B1 | | 2/2003 | Kurihara |
| 6,707,844 B1 * | | 3/2004 | Imaizumi et al. ........... 375/148 |
| 6,768,729 B1 * | | 7/2004 | Ohsuge ....................... 370/342 |
| 6,934,553 B1 * | | 8/2005 | Kuroiwa et al. ............ 455/500 |
| 6,944,207 B1 * | | 9/2005 | Ohno ........................... 375/148 |
| 2002/0034215 A1 * | | 3/2002 | Inoue et al. ................. 375/147 |
| 2002/0054625 A1 * | | 5/2002 | Matsumoto et al. ........ 375/152 |
| 2003/0103555 A1 * | | 6/2003 | Han et al. .................... 375/147 |
| 2004/0048593 A1 * | | 3/2004 | Sano ........................... 455/323 |

FOREIGN PATENT DOCUMENTS

| | | |
|---|---|---|
| JP | 10-32523 | 2/1998 |
| JP | 2001-94471 | 4/2001 |
| JP | 2001-274724 | 10/2001 |

OTHER PUBLICATIONS

English Language Abstract of JP 10-32523.
English Language Abstract of JP 2001-94471.
English Language Abstract of JP 2001-274724.
"W-CDMA Communication Systems", ed. Keiji Tachikawa, 2nd ed., Tokyo: Maruzen, 2001, 109-11, with an English translation of the relevant portion.

* cited by examiner

*Primary Examiner*—Simon Nguyen
(74) *Attorney, Agent, or Firm*—Greenblum & Bernstein, P.L.C.

(57) ABSTRACT

A signal received under a multipath condition is buffered in storage memories 50a and 50b comprising two banks, and while overlap of write and read is allowed, the received data is supplied to matched filters 60a and 60b as much as possible, in a pipeline manner, and in-phase addition of four symbols per unit is performed in in-phase adders 80a and 80b.

In the buffering in storage memories 50a and 50b, processor 40 adaptively changes the search period based on timing information acquired in advance.

16 Claims, 8 Drawing Sheets

DELAY PROFILE MAKING METHOD AND DELAY PROFILE MAKING APPARATUS

BACKGROUND OF THE INVENTION

1. Field of the Invention

The present invention relates to a delay profile making method and a delay profile making apparatus.

2. Description of Related Art

A receiver of W-CDMA system determines the arrival timings of paths that enable RAKE combining, and makes delay profiles during the process of establishing synchronization.

As for the process of making a delay profile, commonly, received data that corresponds to a given search period is temporarily stored in a storage memory; when the storing is done, the data is read at an appropriate timing and supplied to an correlation detector (i.e. matched filter) for correlation detection; in-phase addition is performed with respect to the obtained correlation level; and, utilizing this in-phase addition, power calculation is performed to make a delay profile.

Incidentally, the above power calculation that utilizes in-phase addition refers to a method of calculating power by accumulatively adding a number of in-phase data (i.e. having + or − in common) and performing square calculations with respect to the accumulative calculation values, instead of performing a square calculation on a per received data basis and adding the calculation results. The accumulative calculation has the merit of enlarging the number and improving the S/N.

Typically, the pattern of pilot signals and such, which provides the foundation in delay profile making, is a pattern in which simply the same positive or negative data such as "+1" and "−1" continues.

This, consequently, makes it possible to accumulatively add a given number of correlation levels that are output from a matched filter (i.e. correlation detector) on a continuous basis, and perform in-phase addition operations efficiently.

In such case, changing the number of symbols that are subject to in-phase addition is not difficult, and when efficient power calculation is desired, the number of symbols that are subject to in-phase addition needs to be increased.

However, as described in W-CDMA Communication Systems, ed. Keiji Tachikawa, 2nd ed. (Tokyo: Maruzen, 2001), 109–110, the secondary CPICH in the CPICH (Common Pilot Channel), which is a physical layer in W-CDMA system, uses patterns, in which "+1" and "−1" exist in a mixed manner, for pilot symbol patterns.

Consequently, if correlation detection is performed with respect to the secondary CPICH (referring mainly to cases where channel estimation is performed for each path while the adaptive array antenna is in use), as in the conventional case, by simply accumulatively adding the correlation levels, the positive data and the negative data cancel out each other, and the accumulative addition value becomes 0, thereby making it impossible to detect correlation.

Therefore, performing in-phase addition requires ingenuity that divides data on a per pattern basis and that adds the data at the corresponding positions in respective patterns (i.e. data that share the same + and −).

For instance, if the basic pattern is "+1, −1, −1, +1," it becomes necessary to divide and extract output from a matched filter per four symbols, and add the +1's and the −1's.

However, data processing performed on a per 4-symbol unit basis necessarily increases the number of times of operation and increases the time required for the accumulative addition operation processing. If a method stores all received data from a search period and performs correlation detection as in the conventional case, the processing time before delay profile making becomes long compared to the conventional case, and this becomes an obstacle to timely establishment of synchronization.

Moreover, where the secondary CPICH is used in delay profile making, it is preferable that, before the accumulative addition of four symbols of data (correlation levels) is complete, the following four symbols are output from a matched filter, and furthermore, in view of processing efficiency, it is important that four symbols of data flows in continuously in a pipeline manner, and the conventional art fails to meet these demands.

SUMMARY OF THE INVENTION

It is therefore an object of the present invention to provide a delay profile making method and a delay profile making apparatus that enable efficient delay profile making utilizing in-phase addition, where +1's and −1's exist in a mixed manner in a basic symbol pattern.

According to one aspect of the present invention, there is provided a delay profile making method comprising receiving a CDMA radio signal under a multipath condition; buffering the received signal in a storage memory and thereafter performing a correlation detection of a symbol sequence using a correlation detector, the symbol sequence contained in the received signal and comprising a repetition of a unit pattern of +1 and −1; performing an in-phase addition using the obtained correlation, where the unit pattern is a processing unit; and performing a power calculation of the received signal utilizing the in-phase addition value and making a delay profile, wherein the storage memory adopts a multibank configuration comprising a first bank and a second bank; and wherein received data corresponding to the first path is stored in the first bank and the received data corresponding to the second path is next stored in the second bank, while, in parallel, the received data corresponding to the first path is read from the first bank and supplied to the correlation detector where correlation detection processing is performed.

BRIEF DESCRIPTION OF THE DRAWINGS

The above and other objects of the present invention will appear more fully hereinafter from a consideration of the following description taken in connection with the accompanying drawings wherein examples are illustrated by way of example, in which.

DETAILED DESCRIPTION OF THE PREFERRED EMBODIMENTS

Embodiments of the present invention will be described below with reference to the accompanying drawings.

First, the CPICH (Common Pilot Channel) of W-CDMA system will be described.

Figure 2A:
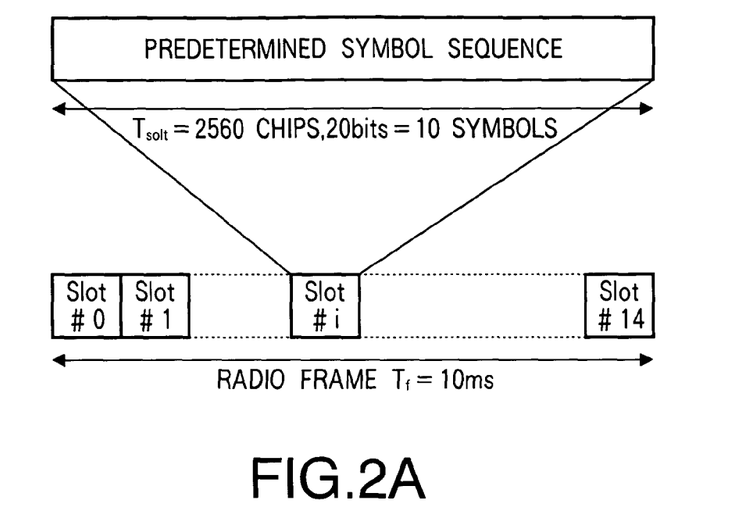
FIG. 2A shows a frame configuration of the CPICH (Common Pilot Channel)
Figure 2B:
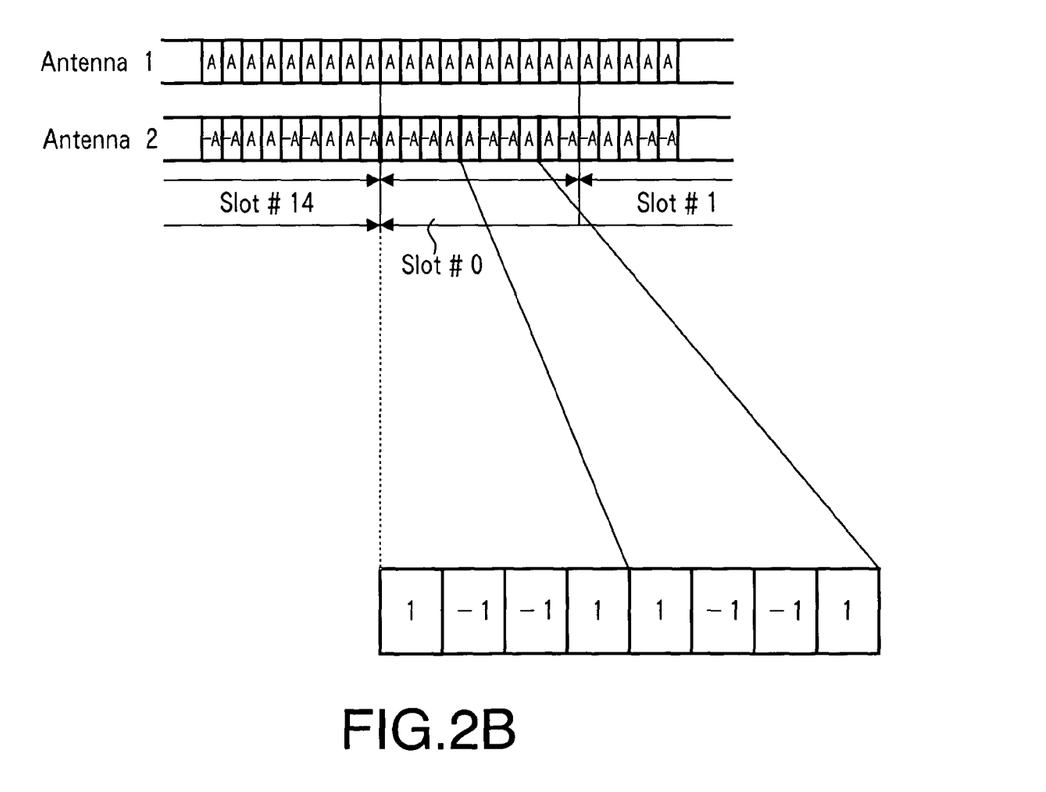
FIG. 2B shows pilot patterns with respect to respective antennas.

FIG. 2A and FIG. 2B each show the frame configuration of the CPICH and a modulation pattern of the CPICH (the same figures as shown on page 110 of the literature cited in the prior art section of the present specification).

As shown in FIG. 2A, a frame of the CPICH comprises a number of slots, each slot comprising a prefixed symbol pattern repeated therein.

In preparation of diversity communication that utilizes the adaptive array antenna, as shown in FIG. 2B, this prefixed symbol pattern, varies between every two antennas (i.e., antenna 1 and antenna 2).

That is, as shown in FIG. 2A, the symbol pattern for antenna 1 is the same as in the conventional case (that is, the continuous pattern of +1's (in the drawing, "A" is used in place of "1")), while the pattern for antenna 2 is a repetition of patterns in which + and – are mixed as in "+1, –1, –1, +1."

In response to predetermined symbol sequences such as above, a channelization code and a scrambling code are multiplied and transmitted from a base station apparatus. This applies to both the primary CPICH and the secondary CPICH.

The characteristics of the primary CPICH include that the same channelization code is always used, that scrambling is executed by the primary scrambling code, that there is only one in a cell, and that it is transmitted over the entire cell.

This primary CPICH is used in so-called 3-step cell search (i.e. determining the receiving timing of the primary synchronization code, identifying the scrambling code group and determining the frame timing, and identifying the scrambling code) for determining to which cell a mobile terminal (such as a mobile telephone) belongs, and, additionally, used as a phase reference in channel estimation processing of the primary CCPCH and AICH and the like on the downlink.

On the other hand, the characteristics of the secondary CPICH include that any synchronization code can be used at a fixed rate, that it can be scrambled by either of the primary scrambling code and the secondary scrambling code, that it may exist in number in a cell or may not exist at all, and that it can be transmitted to only certain areas of a cell.

This secondary CPICH is chiefly used as a phase reference for channel estimation where the adaptive array antenna is used.

It should be noted here that, by the time correlation detection is performed using the secondary CPICH, 3-step cell search using the primary CPICH is complete and the synchronization of the downlink spreading code has been established between a mobile terminal and a base station.

Consequently, the receiving timing of the secondary CPICH is practically known (or at least predictable) from already acquired synchronization information with the base station (i.e. information about the timing of received signals).

The present embodiment, configured to utilize timing information that is already acquired, dynamically changes the search period in delay profile making for the CPICH, and minimizes the search range. By this means, it is possible to enable efficient search and reduce the capacity and power consumption of a storage memory for storing received data.

Moreover, the present embodiment enables efficient buffering of received data by giving a storage memory a configuration with a number of banks (i.e. multi-bank configuration) and by performing read and write operations with respect to these multi-banks in parallel.

FIG. 1, FIG. 3, FIG. 4, FIG. 5 will be described in detail below.

Figure 1:
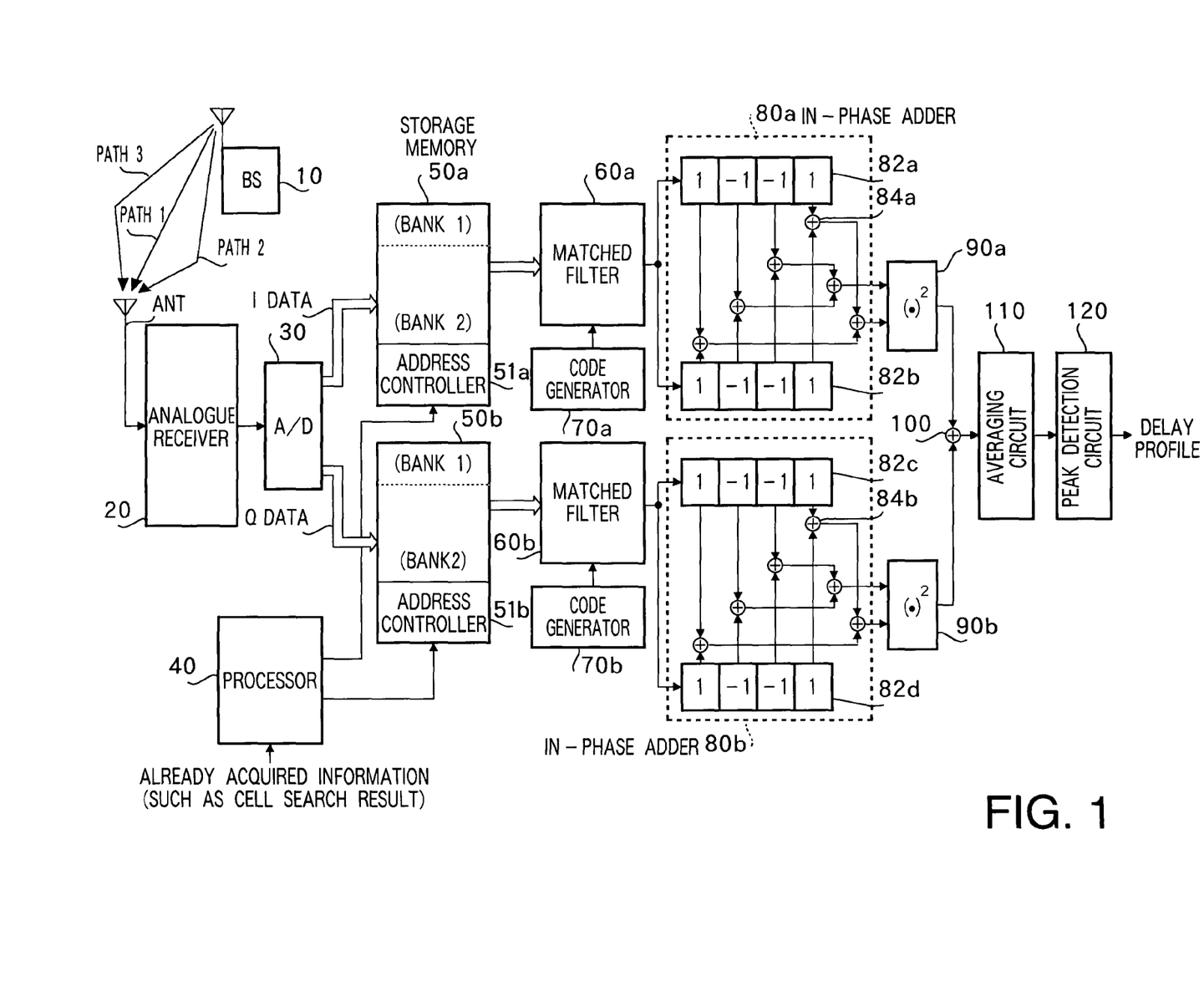
FIG. 1 shows a block diagram showing a configuration of a delay profile making apparatus, in accordance with the first embodiment of the present invention.

The W-CDMA receiver of FIG. 1 (comprising a delay profile making apparatus) receives a transmit wave from base station (BS) 10 with an antenna (ANT), performs the frequency conversion of the wave in analogue receiver 20, and converts the wave into a digital signal in A/D converter 30. From A/D converter 30, the I (in-phase) signal and the Q (quadrature) signal of the QPSK modulation signal are output in parallel.

Storage memories 50a and 50b (for the I signal and for the Q signal, respectively) for storing received data on a temporary basis, have a 2-bank configuration with bank 1 and bank 2, whereby it is possible to make write access to one bank while making read access to the other bank. The read and write addresses are controlled in address controllers 51a and 51b.

From processor (that controls the whole system of the receiver) 40, address controllers 51a and 51b are given information about the start address that indicates the read/write starting point (and the read/write timing).

Processor 40 adaptively determines the read/write start address and read/write timing based on information (already acquired information) that is already acquired by means of the CPICH such as cell search result.

The received data read from storage memories 50a and 51a are sent to matched filters 60a and 60b, and the correlation with the spreading codes (scrambling codes) generated from code generators 70a and 70b is detected.

The correlation levels that are output serially from matched filters 60a and 60b are sent to in-phase adders 80a and 80b with the processing unit of 4 symbols, and in-phase accumulation operation is executed. The processing unit of four-symbols takes into consideration that, as described with reference to FIGS. 2A and 2B, the pilot symbol pattern in the secondary CPICH, with which the present embodiment is chiefly concerned, is a pattern in which "+1" and "–1" exist in a mixed manner, and simple addition following the time sequence will not suffice as "in-phase addition" processing.

In-phase accumulators 80a and 80b each comprise registers 82a, 82b, 82c, 82d that store 4 symbols of data. By means of accumulative adders 84a and 84b, the symbols having the same codes (+ and –) and placed at the same positions are added on a per four symbol unit basis.

Then, a square operation is performed in square operation circuits 90a and 90b, and in adder 100, the respective square values of the I and Q correlation levels are added, and the received power is acquired. Then, averaging processing is performed in averaging circuit 110, and in peak detection circuit 120, the timings and the power levels of peak received powers are acquired. By this means the delay profile is made.

As described above, performing in-phase addition with four symbols per unit increases the number of times of operation, since it is not possible to perform in-phase addition collectively with respect to a large number of symbols, as in the conventional case. Moreover, to perform this processing efficiently, the correlation level of symbols need to be output as much as possible in a pipeline manner, which requires ingenuity in buffering received data.

Next, buffering of received data will be described in detail.

As shown in FIG. 1, the explanation assumes that there are more than 3 paths (including path 1–path 3) for the transmission path from base station 10.

Although a number of paths may exist, how the arrival timings of the respective paths spread in the search period in delay profile making changes depending on circumstances.

Figure 3:
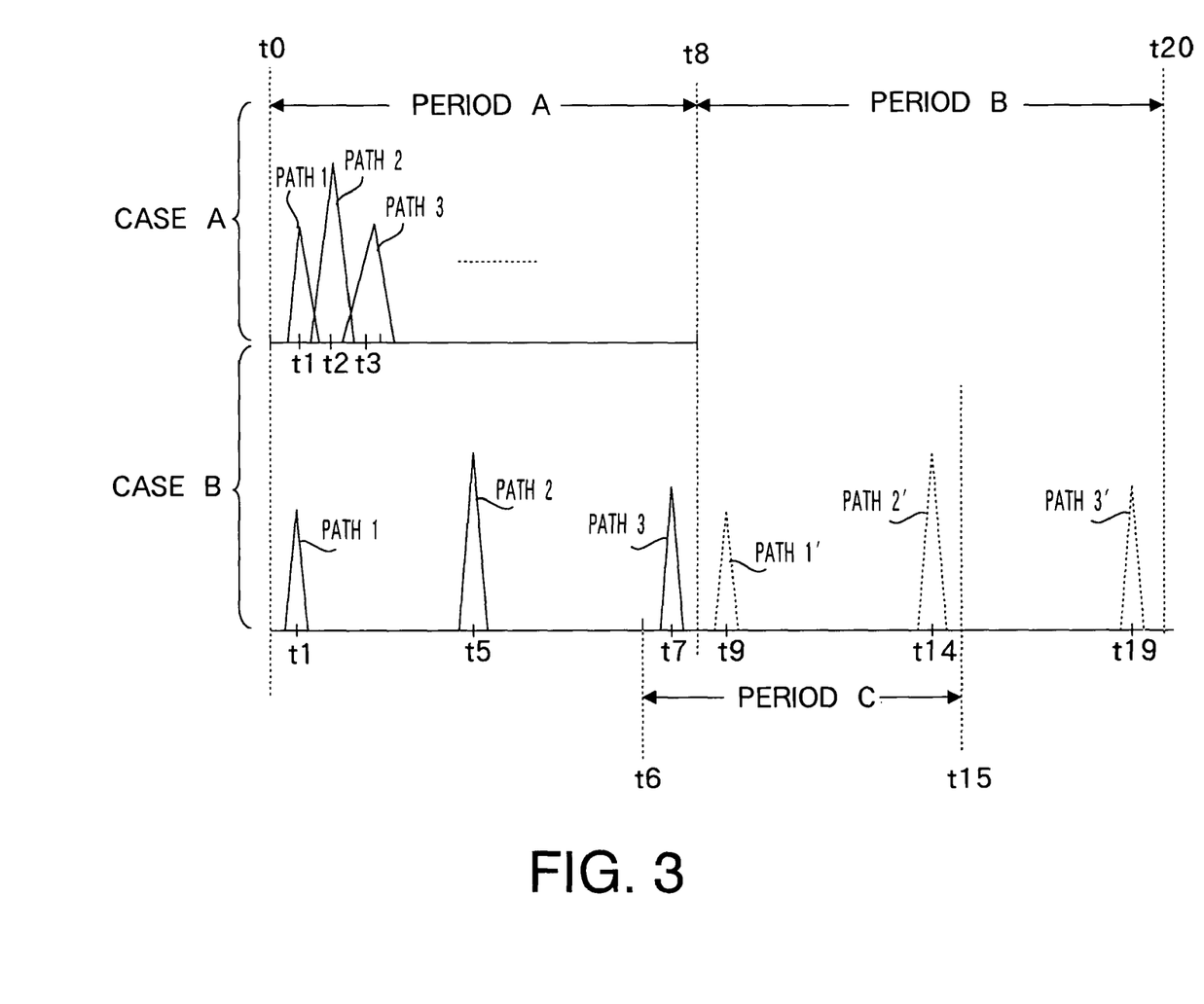
FIG. 3 shows illustrates adaptive change of search period in the delay profile making apparatus in accordance with claim 1.

In Case A shown in the upper portion of FIG. 3, in search period A (time t0–t8), the waves from path 1–path 3 are shown to have arrived in close proximity to each other, while in Case B shown in the lower portion, the arrival timings of path 1–path 3 spread over entire search period A.

In Case A, read/write operations to storage memories 50a and 50b can be performed with efficiency. In Case B, however, since the arrival timings of path 2 and path 3 are late, write access to the storage memory becomes inefficient.

However, even in cases alike Case B, taking the following search period B (time t8–t20) into consideration, the signals from the respective paths are acquired in close proximity, and, utilizing this, it is possible to make the search period itself about a half of period A.

That is, a signal from path 3 is obtained at time t7 immediately before the end of search period A, a signal from path 1 ("1'" in the drawing) appears at time t9 immediately after the beginning of search period B, a signal from path 2 ("2'" in the drawing) appears at t14 around the middle of search period B, and a signal from path 3 ("3'" in the drawing) appears at time t19.

Consequently, when the search period changes from period A (time t0–t8) to period C (time t6–t15), the signals from all paths gather in half the search period.

As described above, cell search using the primary CPICH is complete by the time correlation detection is performed using the secondary CPICH. Consequently, the timing that the secondary CPICH appears is practically predictable from the timing information acquired during the process of the cell search, although the signals may vary due to small differences in time and the reception condition may differ in the use of the adaptive array antenna.

Consequently, as shown in FIG. 3, it is possible to shorten the search period itself by dynamically changing the search period, and with this, it is also possible to reduce the capacity of the storage memory.

Also, as obvious from Case B in FIG. 3, when search is performed based on the reference of search period A, the maximum of the period after a signal from path 1 is received until a signal from next path 2 is received is approximately the same as the length of search period A, and yet changing the search period to period C makes it possible to shorten the maximum of the period after a signal from path 1 is received until a signal from path 2 is received to about a half of search period A. By this means, it is possible to supply the signal from path 2 following the signal of path 1 to matched filters 60a and 60b.

Assume, for instance, that the signal from path 1 stored in a storage memory is supplied to matched filters 60a and 60b, and matched filters 60a and 60b perform correlation detection processing, and the processing is complete.

However, the arrival (storage) of the next signal from path 2 is delayed, and delayed data supply to matched filters 60a and 60b further delays the processing of delay profile making.

In contrast to the above, shifting the search period by taking the following search period in consideration guarantees that path 2 appears at least in half of search period A from the timing of path 1. Consequently it is possible to supply the signal of path 2, following the period of path 1 to matched filters 60a and 60b with certainty within a predetermined period. This is useful in supplying data efficiently in a pipeline manner. Similarly, signals after path 3 can also be efficiently supplied to matched filters 60a and 60b.

FIGS. 4A–4D show the write process and the read process of received data with respect to storage memory 50a (50b).

Figure 4A:
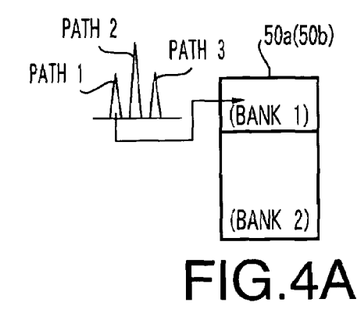
FIG. 4A shows write access to bank 1 in a storage memory, in accordance with the first embodiment.

In FIG. 4A, a received signal from path 1 is stored in bank 1 (the start address is specified by processor 40).

Figure 4B:
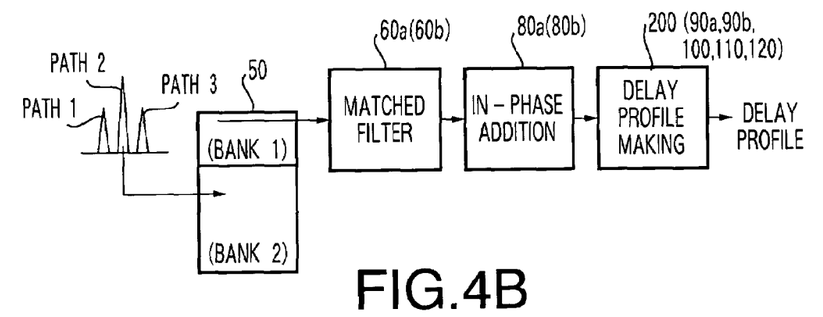
FIG. 4B shows write access/read access to banks 1 and 2 of a storage memory, in accordance with the first embodiment.

Next, as shown in FIG. 4B, a received signal from path 2 is stored at a predetermined address (specified by processor 40), while in the meantime the signal of path 1 is read from bank 1 and supplied to matched filter 60a (60b).

Figure 4C:
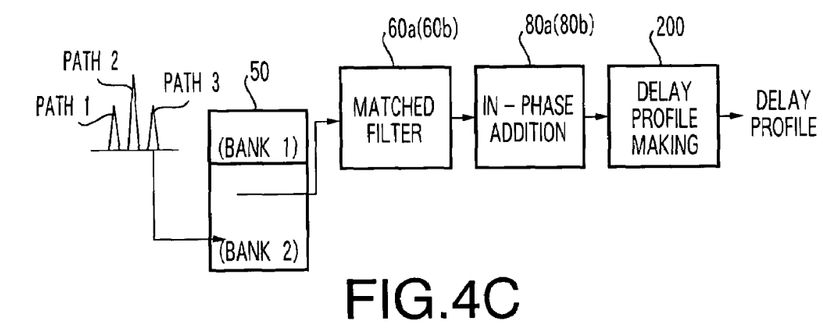
FIG. 4C shows write access/read access to banks 1 and 2 of a storage memory, in accordance with the first embodiment.

Next, as shown in FIG. 4C, a received signal from path 3 is stored at another address in bank 2 (specified by processor 40), while in the meantime the signal of path 2 is read from bank 2 and supplied to matched filter 60a (60b).

Figure 4D:
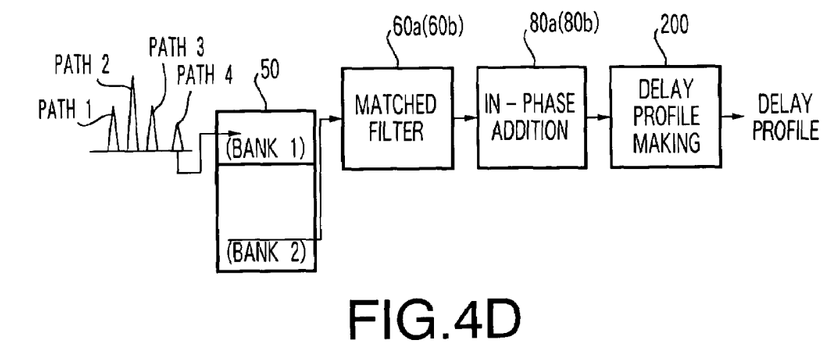
FIG. 4D shows write access/read access to banks 1 and 2 of a storage memory, in accordance with the first embodiment.

Similarly, hereinafter, as shown in FIG. 4D, a signal from path 4 is written into bank 1 while in the meantime the received signal from path 3 is read from bank 2 and supplied to matched filter 60a (60b).

Figure 5A:
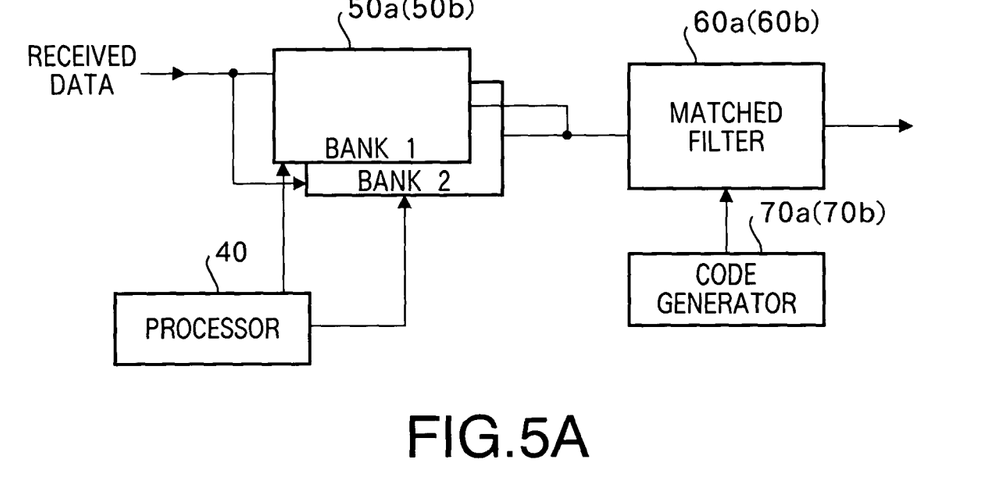
FIG. 5A is a block diagram showing a configuration of a buffering circuit for use in a delay profile making apparatus, in accordance with the first embodiment.
Figure 5B:
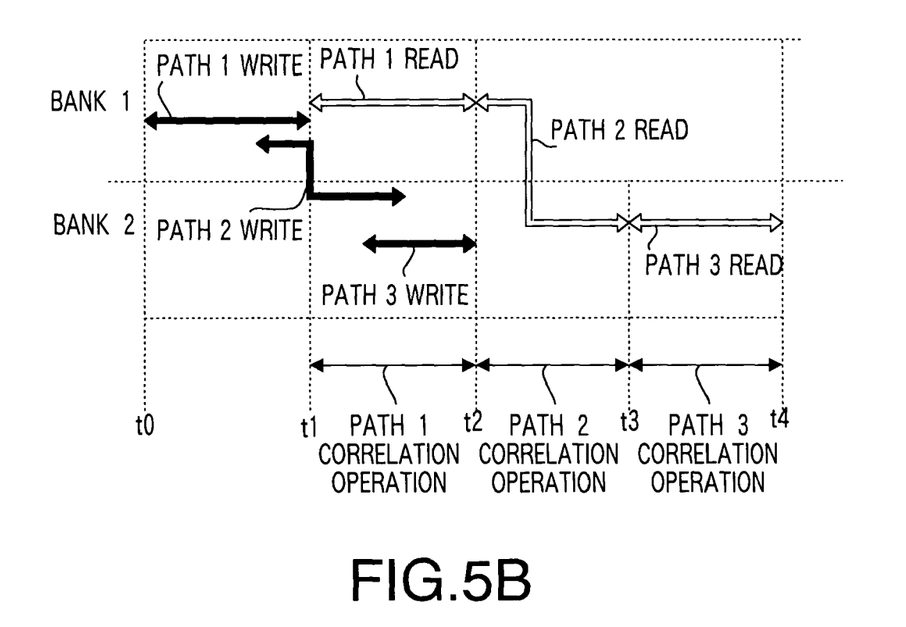
FIG. 5B shows an example of timing for buffering operation and in-phase operation, in accordance with the first embodiment.

The above described configurations and operations of the circuits for buffering signals from respective paths received under the multipath condition can be summarized as shown in FIG. 5A and FIG. 5B.

FIG. 5A shows a buffer circuit that, using storage memories of 2-bank configuration, specifies addresses by means of processor 40, executes parallel write/read access to the respective banks, and supplies received data to matched filter 60a (60b) as efficiently as possible in a pipeline manner.

FIG. 5B shows the write period/read period with respect to banks 1 and 2, and the correlation operation processing period in matched filter 50a (50b).

Referring to FIG. 5B, the write access period is indicated by the bold black arrow, the read access period by the bold white arrow, and the correlation operation period by the solid-line arrow.

Figure 8:
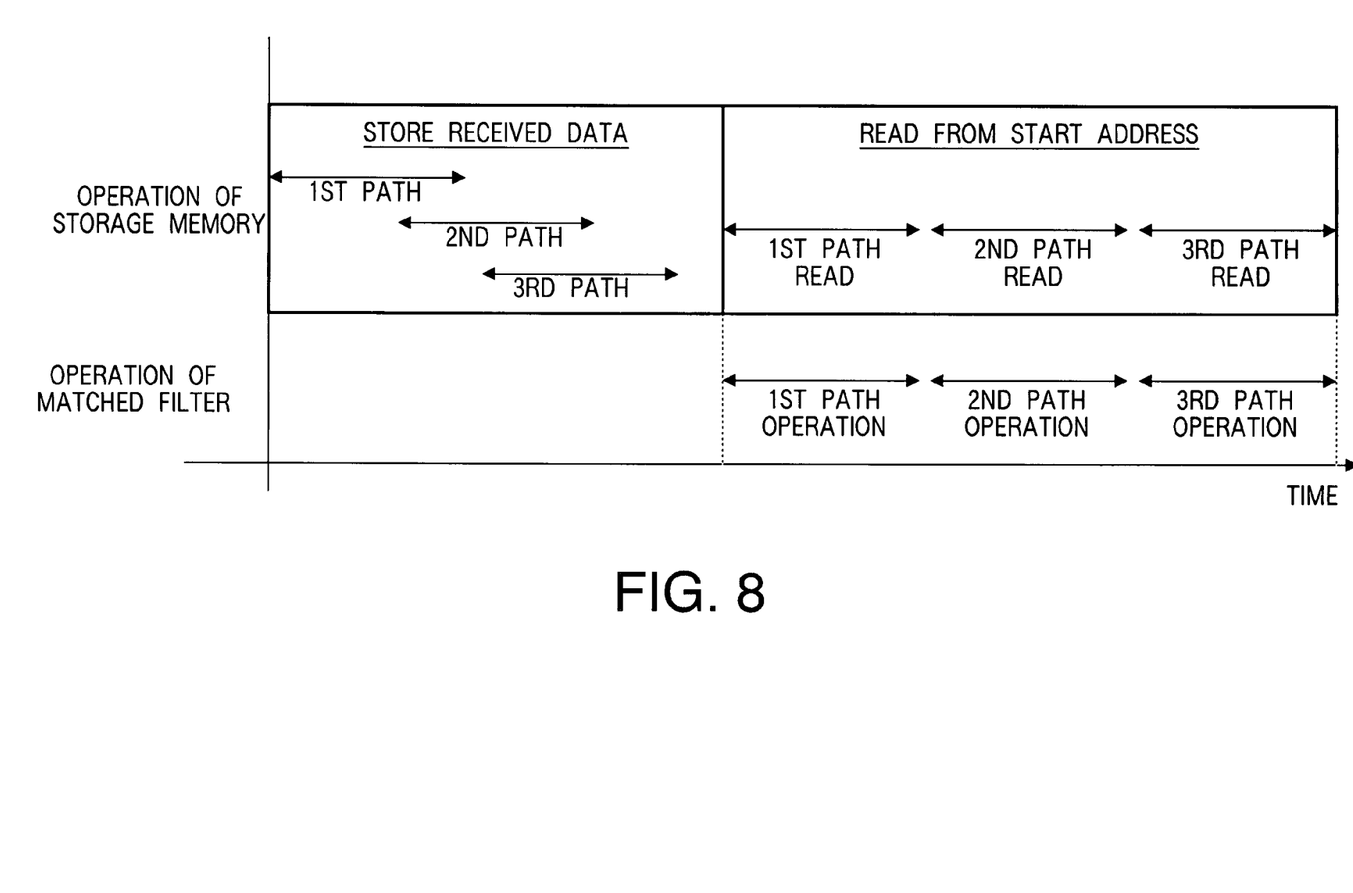
FIG. 8 shows the timings in a conventional received data buffering system.

FIG. 8 shows a timing diagram for conventional system that stores all signals from respective paths in a search period and thereafter reads out the signals in sequence to execute correlation operation (a timing diagram of compared samples).

As obvious from the comparison between FIG. 5B and FIG. 8, the buffering according to the preset invention makes it possible to efficiently supply as much data as possible to a matched filter.

Figure 6A:
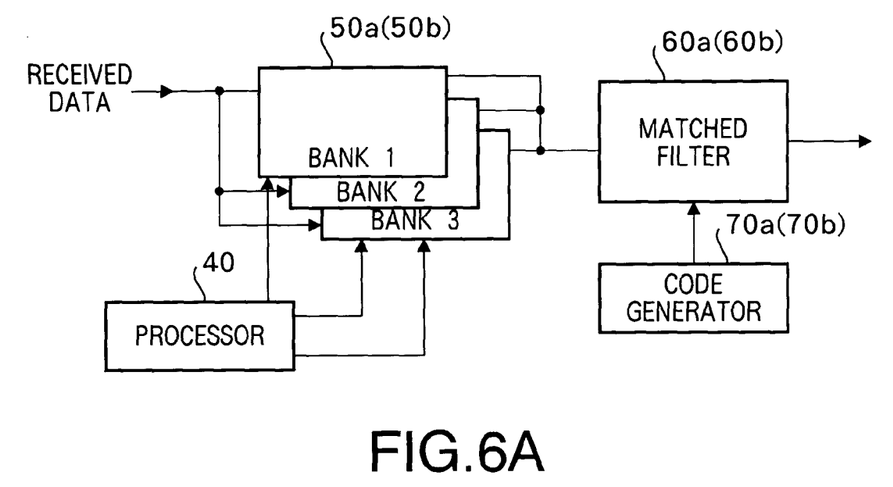
FIG. 6A is a block diagram showing another configuration of a buffering circuit for use in a delay profile making apparatus in accordance with the first embodiment.
Figure 6B:
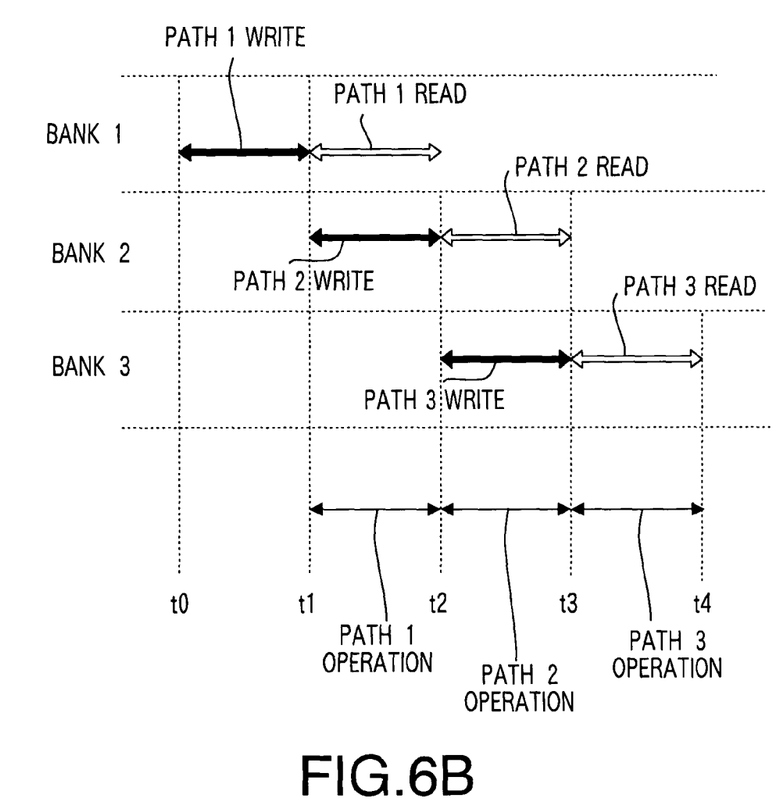
FIG. 6B shows another example of timing for buffering operation and in-phase operation, in accordance with the first embodiment.

The present invention is by no means limited to the configuration of FIG. 5A, and, accordingly, it is possible to configure a storage memory in 3-bank configuration as shown in FIG. 6A. As shown in FIG. 6B, the circuit operation in this case would be that paths 1–3 are written into banks 1–3 in sequence, while, in parallel with this write access, read access is executed, and so as to supply data efficiently to matched filter 60*a* (60*b*).

(Embodiment 2)

Figure 7:
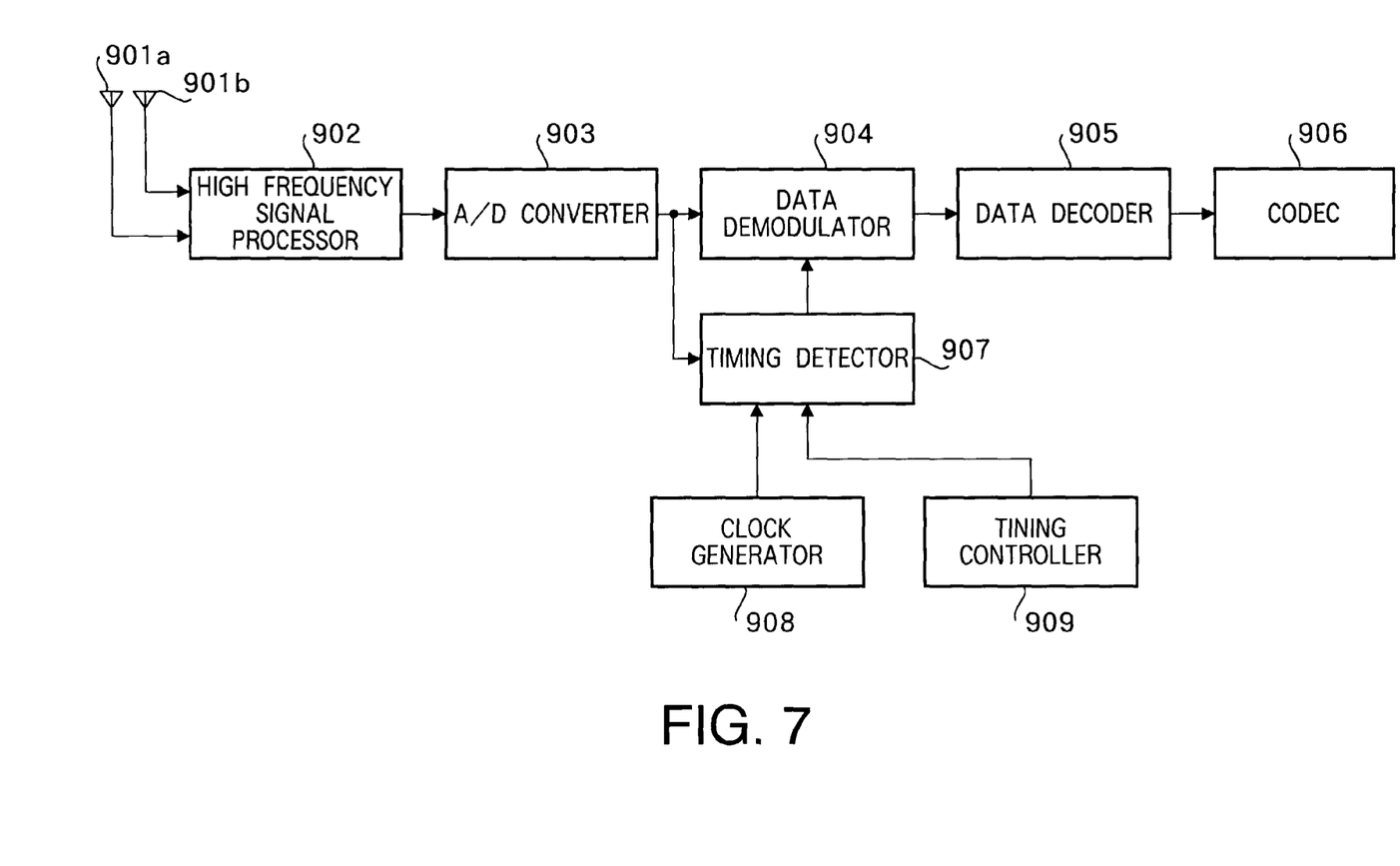
FIG. 7 is a block diagram showing the overall configuration of receiver of W-CDMA system that incorporates a delay profile making apparatus in accordance with the second embodiment of the present invention.

FIG. 7 is a block diagram showing an overall configuration of a receiver of W-CDMA system comprising the delay profile making apparatus as described in the above first embodiment.

As shown in the figure, this W-CDMA receiver comprises adaptive array antennas 901*a* and 901*b*, high frequency signal processor 902, A/D converter 903, data demodulator 904, data decoder 905, code 906, timing detector 907, clock generator 908, timing controller 909.

The delay profile making apparatus is provided in timing detector 907 in FIG. 7.

The receiver of W-CDMA system of FIG. 7 can realize the functions required by IMT 2000 standard for wireless access by regulating the size and power consumption of baseband circuit (system LSI).

Although the technical concept as manifested by the present invention achieves optimum effect when used with system LSI in the field of mobile communication as typified by mobile telephones, this should not be construed as limiting, and the technical concept of the present invention is broadly applicable to data buffering when there is a need to execute many operations in a short period with a demand for data supply in a pipeline manner.

Thus, according to the present invention, it is possible to utilize in-phase addition to delay profiles efficiently, even when a pilot symbol pattern includes +1's and −1's in a mixed manner. Consequently, the functions required by IMT 2000 standard for wireless access can be realized by regulating the size of baseband circuit (system LSI) and power consumption of the circuit.

The present invention is no limited to the above described embodiments, and various variations and modifications may be possible without departing from the scope of the present invention.

This application is based on Japanese Patent Application No. 2002-229016 filed on Aug. 6, 2002, entire content of which is expressly incorporated by reference herein.

What is claimed is:

1. A method for creating a delay profile, comprising:
   receiving a CDMA radio signal under a multipath condition;
   buffering received data corresponding to a first path in a first bank of a storage memory during a first time interval;
   buffering received data corresponding to a second path in a second bank of the storage memory during a second time interval;
   simultaneous to buffering the received data corresponding to the second path, reading the received data corresponding to the first path from the first bank and supplying the received data corresponding to the first path to a correlation detector;
   performing a correlation detection of a symbol sequence using a correlation detector, said symbol sequence being included in said received signal and comprising a repetition of a unit pattern of +1 and −1;
   performing an in-phase addition using a correlation obtained by the correlation detection, in which said unit pattern is a processing unit; and
   performing a power calculation of the received signal utilizing a result of the in-phase addition and creating a delay profile.

2. The method according to claim 1, wherein a capacity of said storage memory is smaller than a capacity of data corresponding to a search period of the delay profile; and
   wherein, to accommodate the received data corresponding to the second path in the second bank of said storage memory, regardless of a spatial relationship between the first path and the second path in said search period, a storage timing for the first bank and the second bank of said storage memory is adaptively changed based on information acquired in advance regarding a timing of the received CDMA radio signal.

3. The method according to claim 1, wherein the symbol sequence included in the received signal is a symbol sequence of a pilot signal of a secondary common pilot channel of a common pilot channel, said common pilot channel being a physical layer in a W-CDMA communication system.

4. The method according to claim 1, further comprising buffering received data corresponding to a third path in the second bank of the storage memory during a third time interval, and
   simultaneous to buffering the received data corresponding to the third path, reading the received data corresponding to the second path from the second bank and supplying the received data corresponding to the second path to the correlation detector.

5. The method according to claim 1, further comprising buffering received data corresponding to a third path in a third bank of the storage memory during a third time interval, and
   simultaneous to buffering the received data corresponding to the third path, reading the received data corresponding to the second path from the second bank and supplying the received data corresponding to the second path to the correlation detector.

6. An apparatus for creating a delay profile, comprising:
   a storage memory that buffers a CDMA radio signal received under a multipath condition by buffering received data corresponding to a first path in a first bank of the storage memory during a first time interval and buffering received data corresponding to a second path in a second bank of the storage memory during a second time interval;
   a correlation detector that performs a correlation detection of a symbol sequence included in said received CDMA radio signal and comprising a repetition of a unit pattern of +1 and −1;
   an in-phase adder that performs an in-phase addition using a correlation obtained by the correlation detection and adopting said unit pattern as a processing unit;
   a power calculator that performs a power calculation of the received signal utilizing a result of the in-phase addition and creates a delay profile, wherein the received data corresponding to the first path is read from the first bank and supplied to the correlation detector simultaneous to the received data corresponding to the second path being buffered in the second bank.

7. The apparatus according to claim 6, wherein a capacity of said storage memory is smaller than a capacity of data corresponding to a search period of the delay profile; and wherein, to accommodate the received data corresponding to the second path in the second bank of said storage memory, regardless of a spatial relationship between the first path and the second path in a search period, a storage timing for the first bank and the second bank of said storage memory is adaptively changed based on information acquired in advance regarding a timing of the received CDMA radio signal.

8. The apparatus according to claim 6, wherein the symbol sequence included in the received CDMA radio signal comprises a symbol sequence of a pilot signal of a secondary common pilot channel of a common pilot channel, said common pilot channel being a physical layer in a W-CDMA communication system.

9. A receiver that supports a W-CDMA communication system standard, comprising the apparatus of creating a delay profile of claim 6.

10. The apparatus according to claim 6, wherein the storage memory buffers received data corresponding to a third path in the second bank of the storage memory during a third time interval, the received data corresponding to the second path being read from the second bank and supplied to the correlation detector simultaneous to the received data corresponding to the third path being buffered in the second bank.

11. The apparatus according to claim 6, wherein the storage memory buffers received data corresponding to a third path in a third bank of the storage memory during a third time interval, the received data corresponding to the second path being read from the second bank and supplied to the correlation detector simultaneous to the received data corresponding to the third path being buffered in the third bank.

12. An apparatus for creating a delay profile, comprising:
a storage memory that buffers a CDMA radio signal received under a multipath condition by buffering received data corresponding to a first path in a first bank of the storage memory during a first time interval, and buffering received data corresponding to a second path in a second bank of the storage memory during a second time interval; and a correlation detector that performs a correlation detection of a symbol sequence included in the received radio signal, wherein the received data corresponding to the first path is read from the first bank and supplied to the correlation detector simultaneous to the received data corresponding to the second path being buffered in the second bank.

13. The apparatus according to claim 12, wherein a capacity of said storage memory is smaller than a capacity of data corresponding to a search period of a delay profile created by the apparatus; and wherein, to accommodate the received data corresponding to the second path in the second bank of said storage memory, regardless of a spatial relationship between the first path and the second path in a search period, a storage timing for the first bank and the second bank of said storage memory is adaptively changed based on information acquired in advance regarding a timing of the received CDMA radio signal.

14. The apparatus according to claim 12, wherein the symbol sequence included in the received CDMA radio signal comprises a symbol sequence of a pilot signal of a secondary common pilot channel of a common pilot channel, said common pilot channel being a physical layer in a W-CDMA communication system.

15. The apparatus according to claim 12, wherein the storage memory buffers received data corresponding to a third path in the second bank of the storage memory during a third time interval, and the received data corresponding to the second path is read from the second bank and supplied to the correlation detector simultaneous to the received data corresponding to the third path being buffered in the second bank.

16. The apparatus according to claim 12, wherein the storage memory buffers received data corresponding to a third path in a third bank of the storage memory during a third time interval, the received data corresponding to the second path being read from the second bank and supplied to the correlation detector simultaneous to the received data corresponding to the third path being buffered in the third bank.

* * * * *